US011960085B2

(12) United States Patent
Shih et al.

(10) Patent No.: US 11,960,085 B2
(45) Date of Patent: Apr. 16, 2024

(54) WAVEGUIDE AND HEAD MOUNTED DISPLAY DEVICE HAVING WAVEGUIDE

(71) Applicant: Coretronic Corporation, Hsin-Chu (TW)

(72) Inventors: Chih-Wei Shih, Hsin-Chu (TW); Hung-Ta Chien, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/412,269

(22) Filed: Aug. 26, 2021

(65) Prior Publication Data

US 2022/0066216 A1 Mar. 3, 2022

(30) Foreign Application Priority Data

Aug. 28, 2020 (CN) .......................... 202010886749.6

(51) Int. Cl.
*G02B 27/01* (2006.01)
*F21V 8/00* (2006.01)
*G02B 6/00* (2006.01)
*G02B 6/10* (2006.01)

(52) U.S. Cl.
CPC ........... *G02B 27/0172* (2013.01); *G02B 6/00* (2013.01); *G02B 6/0075* (2013.01); *G02B 6/10* (2013.01); *G02B 2027/0187* (2013.01)

(58) Field of Classification Search
CPC .... G02B 6/0075; G02B 6/10; G02B 27/0172; G02B 2027/0187
See application file for complete search history.

(56) References Cited

U.S. PATENT DOCUMENTS

| 5,076,664 | A  | 12/1991 | Migozzi |
| 8,432,614 | B2 | 4/2013  | Amitai |
| 8,665,178 | B1 | 3/2014  | Wang |
| 9,423,552 | B2 | 8/2016  | Richards et al. |

(Continued)

FOREIGN PATENT DOCUMENTS

| CN | 104536138 | 4/2017 |
| CN | 108983425 | 12/2018 |

(Continued)

OTHER PUBLICATIONS

"Office Action of Taiwan Counterpart Application", dated Dec. 10, 2021, pp. 1-9.

(Continued)

*Primary Examiner* — Daniel Petkovsek
(74) *Attorney, Agent, or Firm* — JCIPRNET

(57) ABSTRACT

A manufacturing method of a waveguide and a head mounted display device having the waveguide are provided. The head mounted display device includes a display unit, a first waveguide and a second waveguide. The display unit is configured to provide an image beam. The first waveguide is located between the display unit and the second waveguide. The first waveguide is configured to transmit the image beam to the second waveguide and adjust a light shape of the image beam to maintain a field angle and expand a pupil in a single dimension. The second waveguide is configured to transmit the image beam to outside of the head mounted display device, and the second waveguide can extend a light transmission path and provide a uniform image beam.

16 Claims, 14 Drawing Sheets

(56) References Cited

U.S. PATENT DOCUMENTS

| | | | |
|---|---|---|---|
| 11,385,393 B2 * | 7/2022 | Danziger | G02B 6/0031 |
| 11,526,003 B2 * | 12/2022 | Ronen | G02B 6/0065 |
| 2006/0132914 A1 | 6/2006 | Weiss et al. | |
| 2008/0198471 A1 * | 8/2008 | Amitai | G02B 27/285 |
| | | | 359/630 |
| 2021/0141230 A1 * | 5/2021 | Shih | G02B 27/0172 |

FOREIGN PATENT DOCUMENTS

| | | |
|---|---|---|
| TW | I484219 | 5/2015 |
| WO | 2017219433 | 12/2017 |
| WO | 2020106298 | 5/2020 |

OTHER PUBLICATIONS

"Office Action of Taiwan Counterpart Application", dated Apr. 29, 2022, p. 1-p. 5.

* cited by examiner

WAVEGUIDE AND HEAD MOUNTED DISPLAY DEVICE HAVING WAVEGUIDE

CROSS-REFERENCE TO RELATED APPLICATION

This application claims the priority benefit of China application no. 202010886749.6, filed on Aug. 28, 2020. The entirety of the above-mentioned patent application is hereby incorporated by reference herein and made a part of this specification.

TECHNICAL FIELD

The invention relates to a manufacturing method of an optical structure and an optical device having the optical structure, and more particularly, to a manufacturing method of a waveguide and a head mounted display device having the waveguide.

BACKGROUND

With the advancement of display technology and people's desire for high technology, virtual reality and augmented reality technology has gradually matured. A head mounted display (HMD) is a display for realizing this technology. Development history of the head mounted display can trace back to the US military in the 1970s where an optical projection system is used to project images or textual information from a display element to the user's eyes. In recent years, with higher resolution and lower power consumption in a micro display, the head mounted display has been developed into a portable display device. In addition to the military field, the display technology of head mounted displays has also grown and occupied an important position in other fields related to industrial production, simulation training, stereo display, medical, sports, navigation and video games.

However, in the optical engine design of the head mounted display, many difficulties will be encountered in the design for achieving the goal of large viewing angle and small size. For example, due to the conservation of etendue, when the angle of view increases, the f-number increases, and the pupil aperture decreases to increase a target value of modulation transfer function (MTF) required by the lens. Therefore, if it is expected to achieve a large field of view output with a limited length, a pupil aperture reduction is a factor to be considered. However, due to the pupil aperture reduction, the expansion of an image beam in the waveguide becomes more difficult, which makes the brightness of the image beam unable to be reduced. The size of the pupil of the human eye is only approximately 2.5 mm when the light intensity is 1000 to 2000 nits. Therefore, in the case of a small pupil aperture, it becomes more difficult for image light from all angles in the image beam to enter the human eye smoothly.

On the other hand, in the existing geometric waveguide design, the pupil aperture of the optical engine of the head mounted display needs to extend into the waveguide, so that a minimum position where the pupil aperture is reduced can enable the most light to be coupled into the waveguide at a entering position of the main waveguide to improve the efficiency and effectively transfer the large-angle light that is not easy to enter the waveguide into the main waveguide smoothly. However, under such a design, the length of the pupil aperture and the waveguide through which it passes need to be above a certain length. In this way, when the accommodating space in the head mounted display is not enough to accommodate a certain length of waveguide, it is easy to cause a large-angle image loss and a reduction in efficiency.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

To achieve one, a part, or all of the above objectives or other objectives, an embodiment of the invention provides a head mounted display device, which has a large viewing angle, a shortened volume of the head mounted display device, a shortened length of waveguide element, and can be closer to the contour of the human face. Accordingly, a pupil aperture is expanded in a single dimension and a uniform image beam is provided.

The invention also provides a manufacturing method of a waveguide, which can easily manufacture a waveguide with a pupil aperture expansion or light transmission path extended.

Other objects and advantages of the invention can be further illustrated by the technical features broadly embodied and described as follows.

To achieve one, a part, or all of the above objectives or other objectives, an embodiment of the invention proposes a head mounted display device. The head mounted display device is configured to be placed in front of at least one eye of a user, and includes a display unit, the first waveguide and the second waveguide. The display unit is configured to provide an image beam. The first waveguide is located on a transmission path of an image beam. The first waveguide includes: a first plate; and a plurality of first optical micro structures located in the first plate. The first optical micro structures include central optical micro structures respectively located on two sides of a main axis of the image beam, and edge optical micro structures respectively located on the two sides of the main axis of the image beam. The central optical micro structures are closer to the main axis of the image beam than the edge optical micro structures. After the image beam enters the first plate through a first surface of the first plate, a part of the image beam passes through the central optical micro structures, and the other part of the image beam is transmitted to the corresponding edge optical micro structure by the central optical micro structure and leaves the first plate from a second surface of the first plate after passing through the corresponding edge optical micro structure. The second waveguide is located on the transmission path of an image beam. The first waveguide is located between the display unit and the second waveguide. The first waveguide is configured to transmit the image beam to the second waveguide and adjust a light shape of the image beam. The second waveguide is configured to transmit the image beam to the at least one eye of the user. The second waveguide includes a second plate having a light incidence surface. The light incidence surface connects a first surface and a second surface of the second plate. A plurality of second optical micro structures are located in the second plate. Each of the second optical micro structures has an optical surface, the optical surfaces of the second optical micro structures respectively being inclined with respect to the first surface of the second plate; and a plurality of light guide optical film patterns. The light guide optical film patterns are located on the optical surfaces of the second optical micro structures, and the light guide optical film patterns are configured to allow the part of the image beam to pass through and reflect the other part of the image beam. After the image beam enters the second plate through the light incidence surface, the part of the image beam passes through the light guide optical film patterns, and the other part of the image beam leaves the second plate from the second surface of the second plate after being reflected by the light guide optical film patterns.

In an embodiment of the invention, a ratio of an orthographic projection area of the light guide optical film patterns on the second plate to an area of the second plate is less than 30%.

In an embodiment of the invention, an included angle between the first waveguide and the second waveguide is between 90 degrees and 135 degrees.

In an embodiment of the invention, the first optical micro structures of the first waveguide are arranged along a first direction, the second optical micro structures of the second waveguide are arranged along a second direction, and the first direction is perpendicular to the second direction.

In an embodiment of the invention, each of the first optical micro structures has an optical surface. The optical surfaces of the first optical micro structures respectively extend from a position close to the main axis of the image beam and the first surface towards a position away from the main axis of the image beam and close to the second surface to be inclined with respect to the first surface.

In an embodiment of the invention, the first waveguide has a first optical region and a second optical region. The first optical region and the second optical region are respectively located on the two sides of the main axis of the image beam. An inclined direction of the optical surfaces of the first optical micro structures located in the first optical region is mirror symmetric to an inclined direction of the optical surfaces of the first optical micro structures located in the second optical region.

In an embodiment of the invention, the first waveguide has at least one optical film. The at least one optical film is located on at least one of the optical surfaces of the first optical micro structures, and the optical film is configured to allow the part of the image beam to pass through and reflect the other part of the image beam.

In an embodiment of the invention, the at least one optical film located on the central optical micro structures or the edge optical micro structures has a reflectivity of the image beam greater than a transmittance of the image beam.

In an embodiment of the invention, the first optical micro structures further include a plurality of relay optical micro structures. At least one of the relay optical micro structures is provided between the central optical micro structure and the edge optical micro structure. The part of the image beam from the central optical micro structure is transmitted to the corresponding edge optical micro structure after passing through the relay optical micro structure, and the other part of the image beam from the central optical micro structure leaves the first plate from the second surface after being reflected by the relay optical micro structure.

In an embodiment of the invention, the at least one optical film located on the relay optical micro structures has a reflectivity of the image beam less than a transmittance of the image beam.

In an embodiment of the invention, the first plate includes a first structure layer and a second structure layer. The first structure layer of the first plate has a plurality of first inclined surfaces and a plurality of first link surfaces. Each of the first link surfaces connects different ends of the adjacent first inclined surfaces to form a first zigzag-shaped structure. The second structure layer of the first plate has a plurality of second inclined surfaces and a plurality of second link surfaces. Each of the second link surfaces connects different ends of the adjacent second inclined surfaces to form a second zigzag-shaped structure. The second inclined surfaces correspond to the first inclined surfaces and the second link surfaces correspond to the first link surfaces, so that the first zigzag-shaped structure meshes with the second zigzag-shaped structure and the second inclined surfaces and the first inclined surfaces are in contact to form a plurality of optical surfaces of the first optical micro structures.

In an embodiment of the invention, the first waveguide has at least one optical film. The at least one optical film is located on at least one of the first inclined surfaces of the first structure layer and the second inclined surfaces of the second structure layer, and the optical film is configured to allow the part of the image beam to pass through and reflect the other part of the image beam.

In an embodiment of the invention, a minimum distance between adjacent two of the light guide optical film patterns is smaller than a size of a pupil of the user.

In an embodiment of the invention, a ratio of a size of each of the light guide optical film patterns to the minimum distance between the adjacent two of the light guide optical film patterns is between 0.6 and 0.7.

In an embodiment of the invention, the second plate includes a first structure layer and a second structure layer. The first structure layer of the second plate has a plurality of first inclined surfaces and a plurality of first link surfaces. Each of the first link surfaces connects different ends of the adjacent first inclined surfaces to form a first zigzag-shaped structure. The second structure layer of the second plate has a plurality of second inclined surfaces and a plurality of second link surfaces. Each of the second link surfaces connects different ends of the adjacent second inclined surfaces to form a second zigzag-shaped structure. The second inclined surfaces correspond to the first inclined surfaces and the second link surfaces correspond to the first link surfaces, so that the first zigzag-shaped structure meshes with the second zigzag-shaped structure and the second inclined surfaces and the first inclined surfaces are in contact to form a plurality of optical surfaces of the second optical micro structures.

In an embodiment of the invention, the second waveguide has a first optical region and a second optical region. The first optical region is located between the light incidence surface and the second optical region. The first zigzag-shaped structure, the second zigzag-shaped structure and the second optical micro structures are located in the second optical region, and the second waveguide further includes a light guide film. The light guide film is located on a light guide surface inside the second waveguide. The light guide surface is located in the first optical region and parallel to the first surface of the second plate. The light guide film is configured to allow the part of the image beam to pass through and reflect the other part of the image beam. The image beam passed through the light guide film is transmitted in the second waveguide in a manner of total reflection.

In an embodiment of the invention, the first structure layer further includes a first plane. The second structure layer further includes a second plane. The second plane and the first plane are in contact to form the light guide surface.

To achieve one, a part, or all of the above objectives or other objectives, an embodiment of the invention proposes a manufacturing method of a waveguide of a head mounted display device. The waveguide is configured to transmit the image beam. The manufacturing method of the waveguide includes the following steps. A first structure layer is provided. The first structure layer has a plurality of first inclined surfaces and a plurality of first link surfaces. Each of the first link surfaces connects different ends of the adjacent first inclined surfaces to form a first zigzag-shaped structure. A second structure layer is provided. The second structure layer has a plurality of second inclined surfaces and a plurality of second link surfaces. Each of the second link surfaces connects different ends of the adjacent second inclined surfaces to form a second zigzag-shaped structure. At least one optical film is formed on at least one of the first inclined surfaces of the first structure layer or at least one of the second inclined surfaces of the second structure layer. The at least one optical film is configured to allow the part of the image beam to pass through and reflect the other part of the image beam. The first structure layer and the second structure layer are bonded. The second inclined surfaces correspond to the first inclined surfaces and the second link surfaces correspond to the first link surfaces, so that the first zigzag-shaped structure is able to mesh with the second zigzag-shaped structure and the second inclined surfaces and the first inclined surfaces are in contact to form a plurality of optical surfaces of a plurality of optical micro structures.

In an embodiment of the invention, the waveguide is a first waveguide. A first plate of the first waveguide is formed after the first structure layer and the second structure layer are bonded. The optical micro structures are a plurality of first optical micro structures. The first waveguide has a first optical region and a second optical region. The first optical region and the second optical region are respectively located on the two sides of the main axis of the image beam. An inclined direction of the optical surfaces of the first optical micro structures located in the first optical region is mirror symmetric to an inclined direction of the optical surfaces of the first optical micro structures located in the second optical region.

In an embodiment of the invention, the first optical micro structures include two central optical micro structures and two edge optical micro structures. The central optical micro structures respectively located on two sides of a main axis of the image beam. The edge optical micro structures respectively located on the two sides of the main axis of the image beam. The central optical micro structures are closer to the main axis of the image beam than the edge optical micro structures. After the image beam enters the first plate through a first surface, a part of the image beam passes through the central optical micro structures, and the other part of the image beam is transmitted to the corresponding edge optical micro structure by the central optical micro structure and leaves the first plate after passing through the corresponding edge optical micro structure.

In an embodiment of the invention, the waveguide is a second waveguide. A second plate of the second waveguide is formed after the first structure layer and the second structure layer are bonded. The optical micro structures are a plurality of second optical micro structures. The method of forming the at least one optical film includes the following steps. A photomask is provided, and the photomask has a plurality of through holes. The photomask is made to overlap the first structure layer or the second structure layer, and projection planes of the through holes on the first structure layer or the second structure layer are made to overlap the at least one of the first inclined surfaces of the first structure layer or the at least one of the second inclined surfaces of the second structure layer. A plurality of light guide optical film patterns of the at least one optical film are formed on the at least one of the first inclined surfaces of the first structure layer or the at least one of the second inclined surfaces of the second structure layer through the through holes of the photomask. After the image beam enters the second plate through the light incidence surface, the part of the image beam passes through the light guide optical film patterns, and the other part of the image beam leaves the second plate after being reflected by the light guide optical film patterns. A ratio of an orthographic projection area of the light guide optical film patterns on the second plate to an area of the second plate is less than 30%.

In an embodiment of the invention, the photomask is a plane structure or has a zigzag-shaped structure. When the photomask has the zigzag-shaped structure, the zigzag-shaped structure is able to mesh with the first zigzag-shaped structure or the second zigzag-shaped structure, the through holes of the photomask penetrate a plurality of inclined surfaces of the zigzag-shaped structure, and the inclined surfaces of the zigzag-shaped structure correspond to the at least one of the first inclined surfaces of the first structure layer or the at least one second inclined surfaces of the second structure layer.

In an embodiment of the invention, the second waveguide has a first optical region and a second optical region. The first optical region is located between the light incidence surface and the second optical region. The first structure layer further includes a first plane. The second structure layer further includes a second plane. The first plane and the second plane are located in the first optical region. The first zigzag-shaped structure, the second zigzag-shaped structure and the second optical micro structures are located in the second optical region. The manufacturing method of the waveguide further includes the following steps. A light guide film is formed on the first plane or the second plane. The light guide film is configured to allow the part of the image beam to pass through and reflect the other part of the image beam. After the first structure layer and the second structure layer are bonded, the first plane and the second plane are in contact to form a light guide surface, and the image beam passed through the light guide film on the light guide surface is transmitted in the second waveguide in a manner of total reflection.

Based on the above, the embodiments of the invention have at least one of the following advantages and effects. In the embodiments of the invention, through the configuration of the first waveguide, the image beam can be transmitted to the second waveguide, and a light shape can be adjusted, while maintaining the angle of view and expanding the pupil aperture in a single dimension. Through the configuration of the second waveguide, the transmission path of the image beam can be extended and has good uniformity. In this way, the head mounted display device can have a large viewing angle and can provide good viewing quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
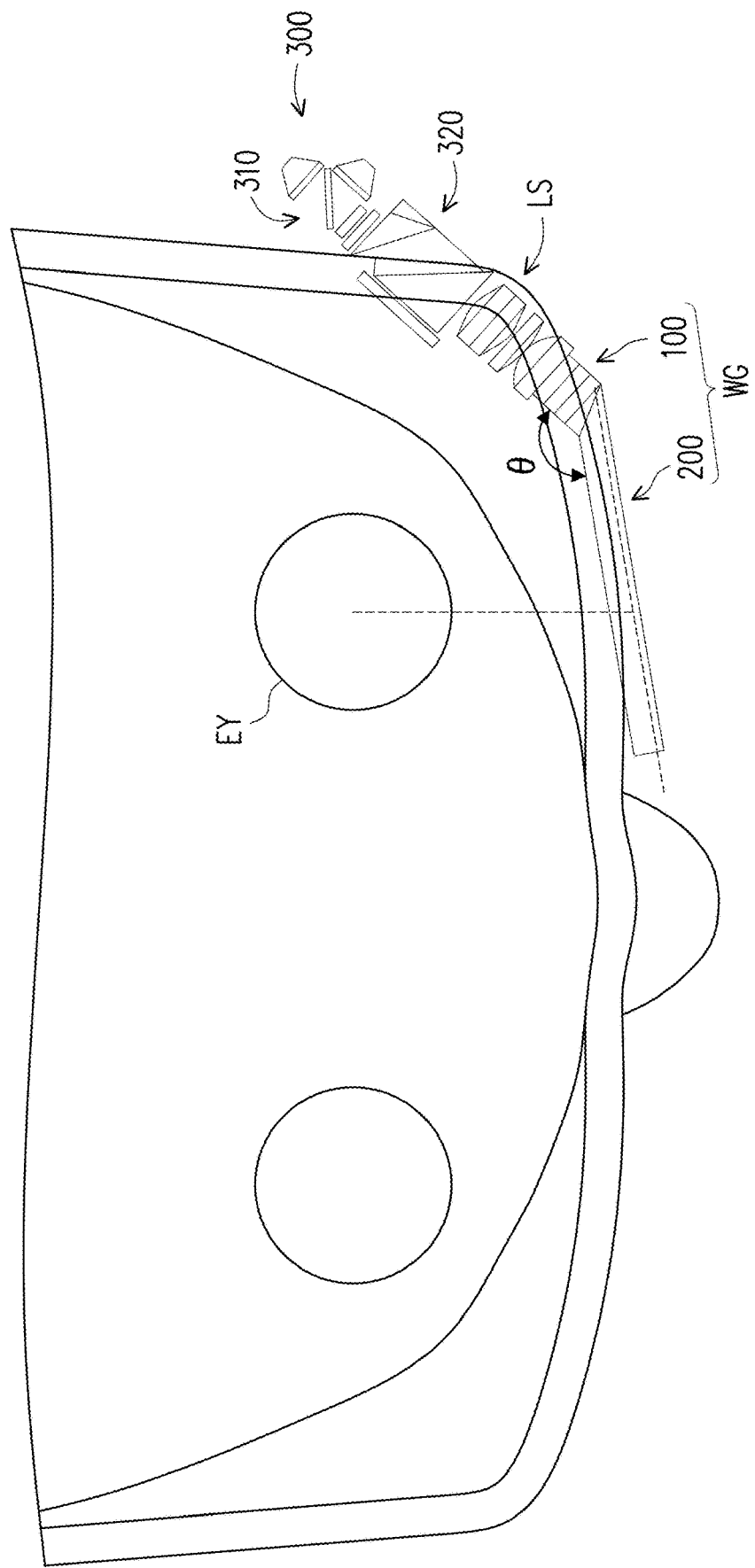
FIG. 1A is a schematic top view of a user wearing a head mounted display device according to an embodiment of the invention.
Figure 1B:
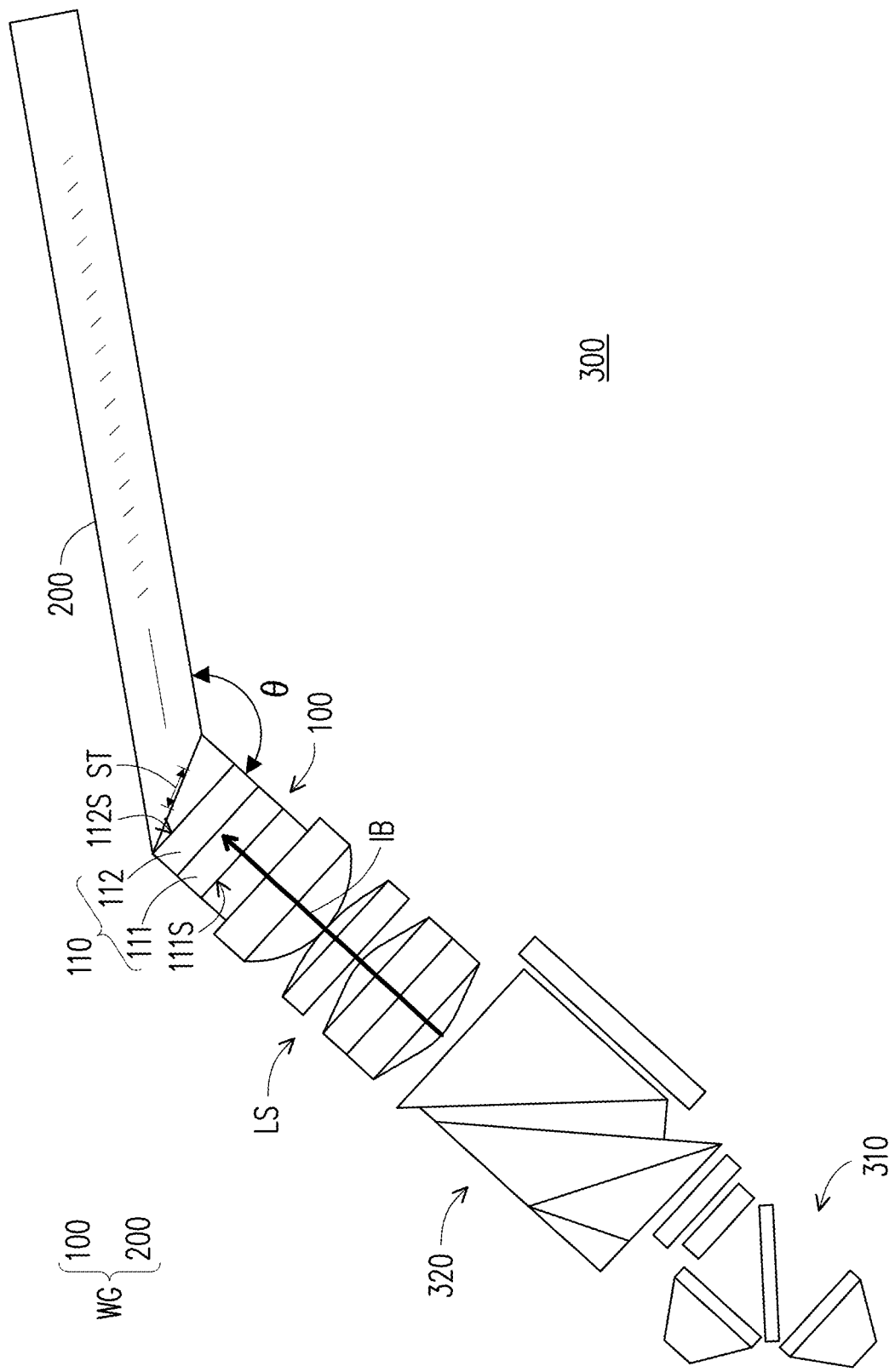
FIG. 1B is a schematic structural diagram of the head mounted display device of FIG. 1A.

FIG. 1A is a schematic top view of a user wearing a head mounted display device according to an embodiment of the invention. FIG. 1B is a schematic structural diagram of the head mounted display device of FIG. 1A. Referring to FIG. 1A and FIG. 1B, in this embodiment, a head mounted display device 300 is configured to be placed in front of at least one eye EYE of a user, and includes an illumination system 310, a display unit 320, and a waveguide element WG including a first waveguide 100 and a second waveguide 200. The display unit 320 is configured to provide an image beam IB. In this embodiment, the display unit 320 includes, for example, a digital micromirror device (DMD) for converting an illumination beam (a first illumination beam) from the illumination system 310 into the image beam IB. In an embodiment, the display unit 320 includes, for example, a liquid crystal on silicon (LCoS) display device, and the type of the display unit 320 is not limited in the invention. The display unit 320 may further include a prism for transmitting the illumination beam.

Specifically, as shown in FIG. 1A and FIG. 1B, after leaving the display unit 320, the image beam IB is transmitted to the waveguide element WG through a lens module LS and converges at a stop ST.

In this embodiment, the first waveguide 100 is located between the display unit 320 and the second waveguide 200. The first waveguide 100 is configured to transmit the image beam IB to the second waveguide 200 and adjust a light shape of the image beam IB. The second waveguide 200 is configured to transmit the image beam IB to the at least one eye EYE of the user.

In this embodiment, the stop ST is located outside the display unit 320, and the display unit 320 is located between the illumination system 310 and the stop ST on a transmission path of the image beam IB. The stop ST is located in one of the first waveguide 100, the second waveguide 200, or a position where the first waveguide 100 and the second waveguide 200 are connected. The stop ST is a position with the smallest cross-sectional area of a reduced beam of the image beam IB. For instance, in this embodiment, the minimum cross-sectional area of the reduced beam of the image beam IB is defined as a pupil aperture, and the shape of the pupil aperture is, for example, a circle. However, in this embodiment, the shape and size of the pupil aperture at the stop ST are only for illustration, and the invention is not limited to thereto.

In this embodiment, the image beam IB converges at the stop ST, and diverges and passes through the waveguide element WG after passing through the stop ST. In this embodiment, the waveguide element WG has a light entrance end located on the first waveguide 100 and a light exit end located on the second waveguide 200. The light entrance end is suitable for receiving the image beam IB. The image beam IB is transmitted by the waveguide element WG and emitted from the light exit end to be transmitted to the human eye.

As shown in FIG. 1A and FIG. 1B, in this embodiment, the waveguide element WG formed by the combination of the first waveguide 100 and the second waveguide 200 is a side-entry waveguide structure. Moreover, in this embodiment, an included angle θ between the first waveguide 100 and the second waveguide 200 is set as an obtuse angle, which is between 90 degrees and 135 degrees. In this way, the stop ST of the head mounted display device is located in the waveguide element WG, so that the most image beam can be coupled into the waveguide element WG, and the large-angle image beam that is not easy to enter the waveguide element WG can be effectively transmitted into waveguide element WG. Also, the required length from the lens module LS to the stop ST can be shortened to within 8 mm. Compared with the existing head mounted displays, with the same light engine structure (i.e., the illumination system 310 and the display unit 320), the length from the lens module LS to the stop ST in the existing head mounted display is a length of approximately 11 mm. It can be seen that the waveguide element WG formed by the combination of the first waveguide 100 and the second waveguide 200 of this embodiment has a reduced size, can be easily installed in the head mounted display device, and can reduce the risk of missing large-angle image frames and reduced efficiency.

In addition, the structure of the waveguide element WG formed by the combination of the first waveguide 100 and the second waveguide 200 of this embodiment can also effectively conform to the user's head contour and shorten the length of the waveguide element WG. Specifically, when the first waveguide 100 and the second waveguide 200 are perpendicular to each other, there will be a gap between the waveguide element WG and the user's face, so the required length of the waveguide element WG needs to be longer. Nonetheless, as shown in FIG. 1, the included angle between the first waveguide 100 and the second waveguide 200 is between 90 degrees and 135 degrees. In this way, the user's head contour can be conformed to minimize the gap between the waveguide element WG and the user's face, and the required length of the waveguide element WG can be shortened. Accordingly, the image beam IB can enter the human eye faster with less diffusion tendency, so that the visual angle of the eye can be enlarged.

The structures of the first waveguide 100 and the second waveguide 200 will be further described below with reference to FIG. 2A to FIG. 3E.

Figure 2A:
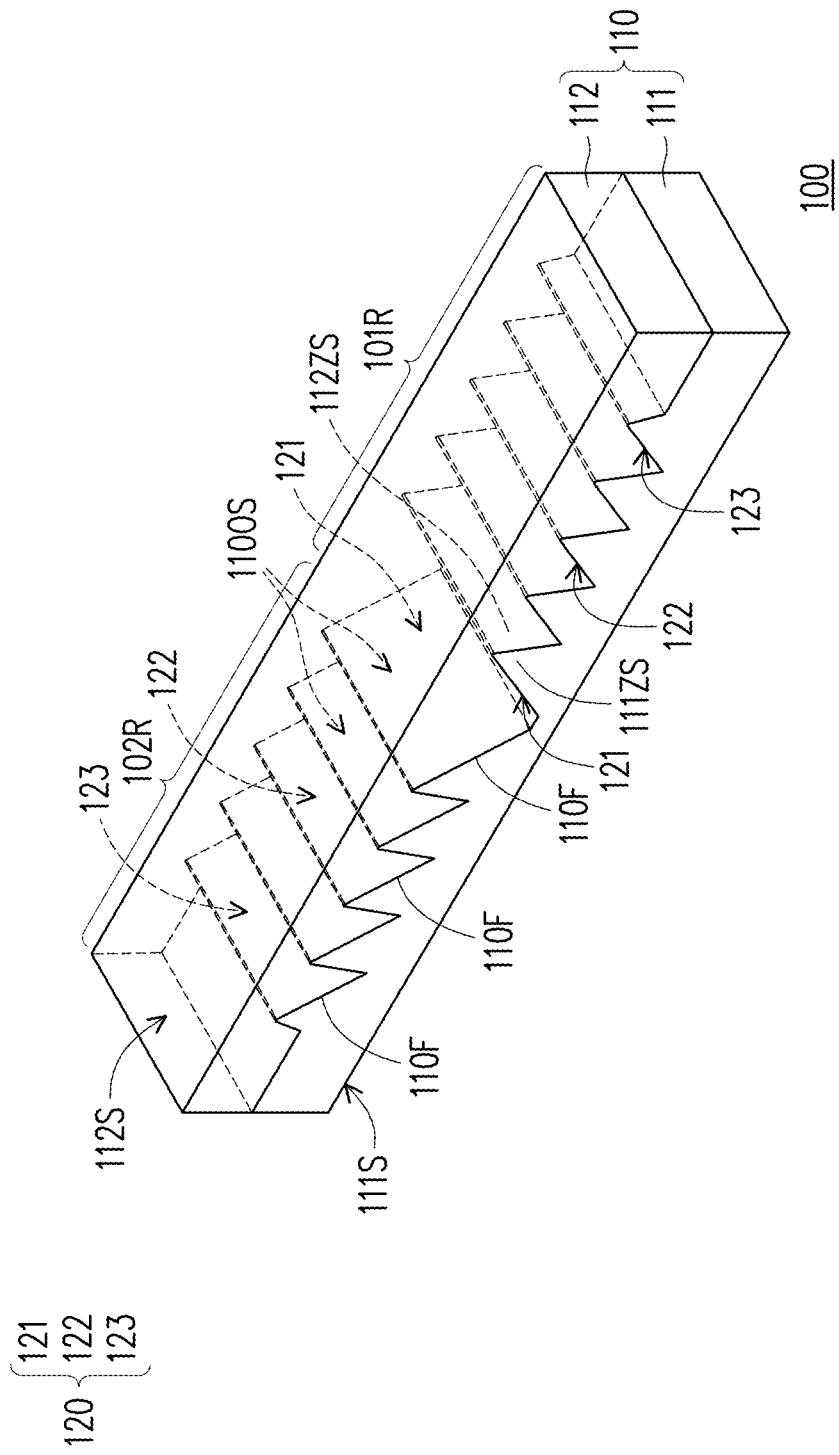
FIG. 2A is a schematic perspective view of a first waveguide of FIG. 1B.
Figure 2B:
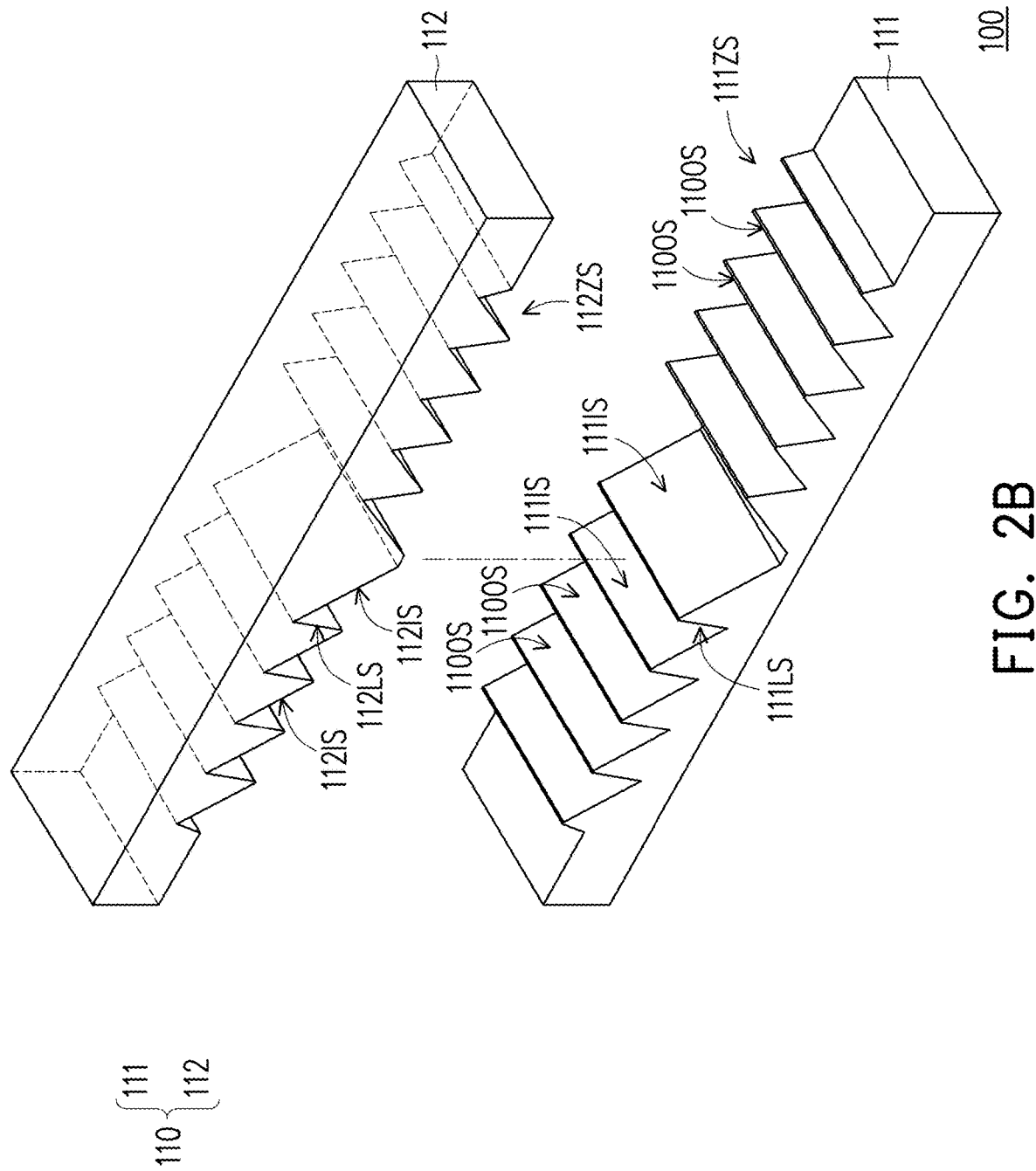
FIG. 2B is an exploded view of the first waveguide of FIG. 2A.
Figure 2C:
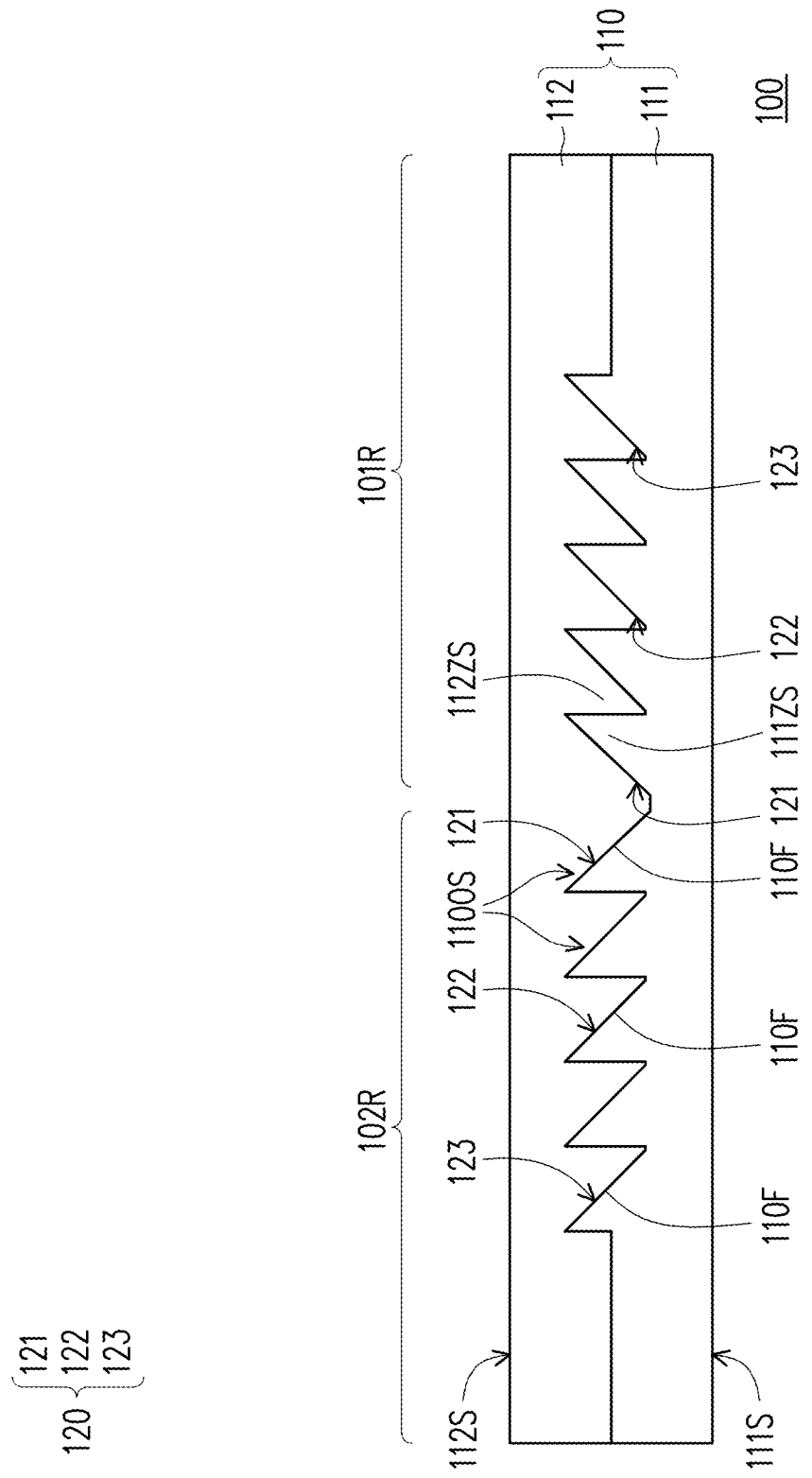
FIG. 2C is a schematic side view of the first waveguide of FIG. 2A.
Figure 2D:
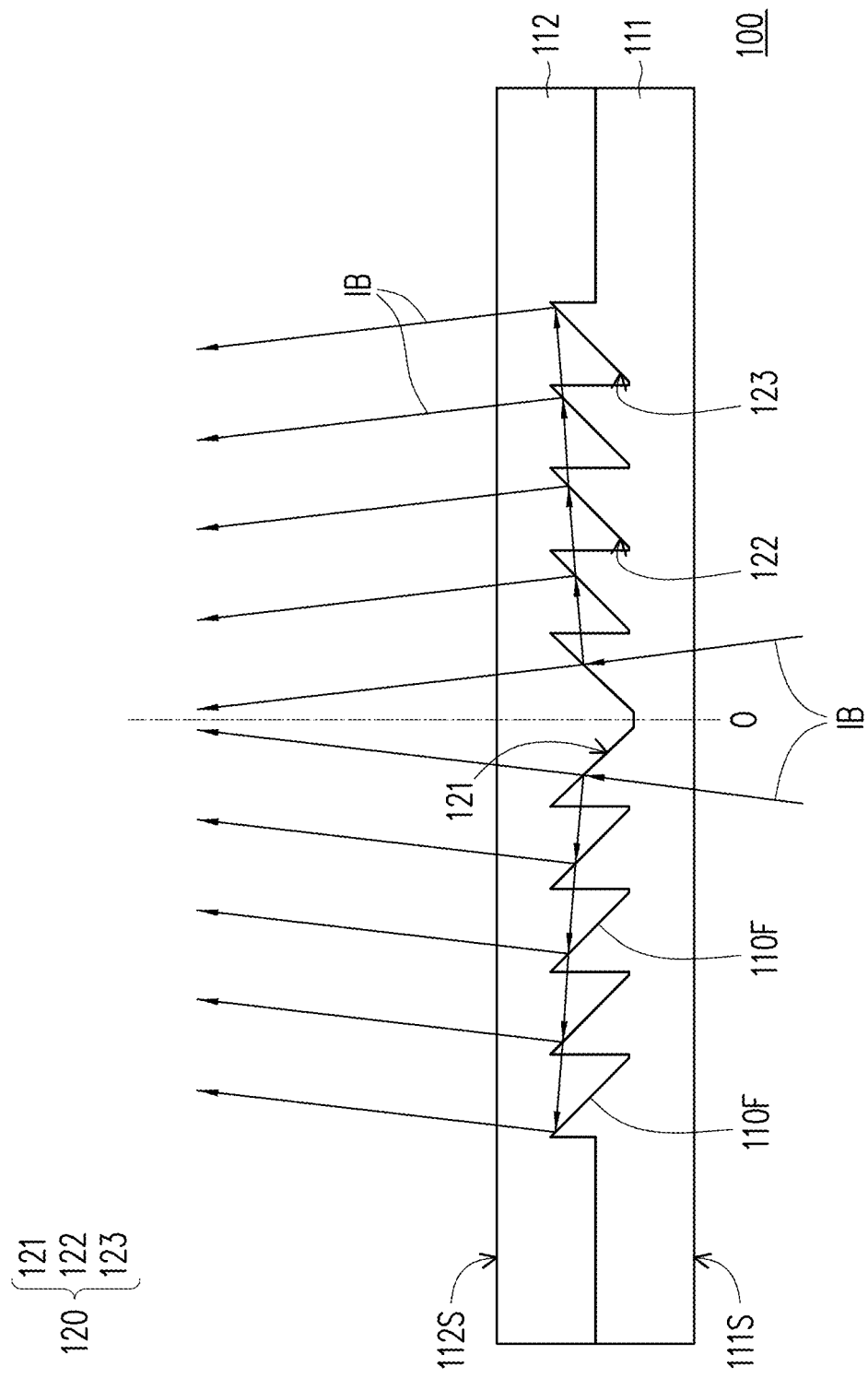
FIG. 2D is a schematic diagram of an optical path of the first waveguide of FIG. 2A.

FIG. 2A is a schematic perspective view of a first waveguide of FIG. 1B. FIG. 2B is an exploded view of the first waveguide of FIG. 2A. FIG. 2C is a schematic side view of the first waveguide of FIG. 2A. FIG. 2D is a schematic diagram of an optical path of the first waveguide of FIG. 2A. As shown in FIG. 2A to FIG. 2C, in this embodiment, the first waveguide 100 includes a first plate 110 and a plurality of optical micro structures 120. The first plate 110 has a first surface 111S and a second surface 112S. The first optical micro structures 120 are located in the first plate 110. The first optical micro structures 120 include two central optical micro structures 121, a plurality of relay optical micro structures 122 and two edge optical micro structures 123. The two central optical micro structures 121 are respectively located on two sides of a main axis O of the image beam IB. The two edge optical micro structures 123 are respectively located on the two sides of the main axis O of the image beam IB, and the two central optical micro structures 121 are closer to the main axis O of the image beam IB than the two edge optical micro structures 123. Furthermore, at least one of the relay optical micro structures 122 is provided between the central optical micro structure 121 and the edge optical micro structure 123.

More specifically, as shown in FIG. 2A to FIG. 2C, in this embodiment, each of the first optical micro structures 120 has an optical surface 110OS. The optical surfaces 110OS of the first optical micro structures 120 respectively extend from a position close to the main axis O of the image beam IB in a direction away from the main axis O of the image beam IB to be inclined with respect to the first surface 111S. Further, in this embodiment, the first waveguide 100 has a first optical region 101R and a second optical region 102R. The first optical region 101R and the second optical region 102R are respectively located on the two sides of the main axis O of the image beam IB. An inclined direction of the optical surfaces 110OS of the first optical micro structures 120 located in the first optical region 101R is mirror symmetric to an inclined direction of the optical surfaces 110OS of the first optical micro structures 120 located in the second optical region 102R.

Specifically, as shown in FIG. 2C, the first waveguide 100 has at least one optical film 110F. The at least one optical film 110F is located on at least one of the optical surfaces 110OS of the first optical micro structures 120. The optical film 110F is configured to allow a part of the image beam IB to pass through and reflect the other part of the image beam IB. For instance, the first waveguide 100 can be manufactured in the following steps. First of all, as shown in FIG. 2B, a first structure layer 111 and a second structure layer 112 are provided. The first structure layer 111 has a plurality of first inclined surfaces 111IS and a plurality of first link surfaces 111LS. The second structure layer 112 also has a plurality of second inclined surfaces 112IS and a plurality of second link surfaces 112LS. Each of the first link surfaces 111LS of the first structure layer 111 connects different ends of the adjacent first inclined surfaces 111IS to form a first zigzag-shaped structure 111ZS. Each of the second link surfaces 112LS of the second structure layer 112 connects different ends of the adjacent second inclined surfaces 112IS to form a second zigzag-shaped structure 112ZS. The at least one optical film 110F is formed on at least one of the first inclined surfaces 111IS of the first structure layer 111 or at least one of the second inclined surfaces 112IS of the second structure layer 112. In other words, the at least one optical film 110F is located on at least one of the first inclined surfaces 111IS of the first structure layer 111 and the second inclined surfaces 112IS of the second structure layer 112.

Then, the first structure layer 111 and the second structure layer 112 are bonded. The second inclined surfaces 112IS correspond to the first inclined surfaces 111IS and the second link surfaces 112LS correspond to the first link surfaces 111LS, so that the first zigzag-shaped structure 111ZS is able to mesh with the second zigzag-shaped structure 112ZS and the second inclined surfaces 112IS and the first inclined surfaces 111IS are in contact to form a plurality of optical surfaces 110OS of the optical micro structures. The first plate 110 of the first waveguide 100 is formed after the first structure layer 111 and the second structure layer 112 are bonded.

In this way, as shown in FIG. 2D, after the image beam IB enters the first plate 110 through the first surface 111S, the part of the image beam IB passes through the two central optical micro structures 121, and the other part of the image beam IB is transmitted to the corresponding edge optical micro structure 123 through the central optical micro structure 121. More specifically, the part of the image beam IB from the central optical micro structure 121 is transmitted to the corresponding edge optical micro structure 123 after passing through the relay optical micro structure 122, and the other part of the image beam IB from the central optical micro structure 121 leaves the first plate 110 from the second surface 112S after being reflected by the relay optical micro structure 122. The image beam IB that is not reflected by the relay optical micro structure 122 to leave the first plate 110 can continue to be transmitted in the first plate 110, and can leave the first plate 110 from the second surface 112S after passing through the corresponding edge optical micro structure 123. It can be seen from FIG. 2D that the image beam IB will be mirrored with the main axis O and leave the first plate 110 in parallel.

Specifically, in this embodiment, the optical films 110F located on different optical micro structures may have different reflectivity designs due to different reflection/transmission requirements. For instance, in this embodiment, the at least one optical film 110F located on the two central optical micro structures 121 or the edge optical micro structures 123 has a reflectivity of the image beam IB greater than a transmittance of the image beam IB. The at least one optical film 110F located on the relay optical micro structures 122 has a reflectivity of the image beam IB less than a transmittance of the image beam IB. In this way, the central optical micro structure 121 with high reflection characteristics can effectively reflect the image beam IB and extend its transmission path backward. Other than extending the transmission path of the image beam IB backward, and the relay optical micro structure 122 with high transmission characteristics can also reflect the image beam IB and make it leave the first plate 110. The central optical micro structure 123 with high reflection characteristics can effectively make the image beam IB leave the first plate 110. In this way, as shown in FIG. 1B and FIG. 2C, the image beam IB leaving the first plate 110 of the first waveguide 100 will be transmitted into the second waveguide 200. Accordingly, the pupil aperture of the image beam IB transmitted to the second waveguide 200 can be effectively expanded.

In addition, the pupil aperture of the image beam IB can be further expanded through the optical film 110F. Therefore, the characteristics of the optical film 110F also affect uniformity of the entire pupil aperture, such as the uniformity of brightness and the uniformity of color. Furthermore, when uniformity of the pupil aperture is not the same, it will also affect the uniformity of the color point entering the pupil. Because the illumination beam used for forming the image beam IB leaves from light-emitting elements of the illumination system 310 and the light-emitting elements of the illumination system 310 emit different color light distributions, the uniformity of the pupil aperture of different colors has different uniformity under different colors. For instance, when pupil aperture distributions of red, green, and blue light are different, the color uniformity will be poor, but when the uniformity of the pupil aperture is exactly the same for red, green, and blue light, the color point uniformity will be improved significantly. Therefore, in this embodiment, the optical film 110F can also be adjusted for reflectivity/transmittance according to the color light conditions of different wavelengths. In this way, when it is confirmed that the characteristics of the optical film 110F and the uniformity of the pupil aperture of different color light are both in an ideal state, the color point distribution output by the display unit 320 will be similar to the color point distribution seen by the pupil of the human eye, thereby enhancing viewing quality.

In addition, in FIG. 2C, the number of the optical films 110F is exemplified by 10 optical films located on different optical micro structures. However, the invention is not limited in this regard. The number of optical films 110F may vary with different optical machines, but there will be at least one or more optical film.

Figure 3A:
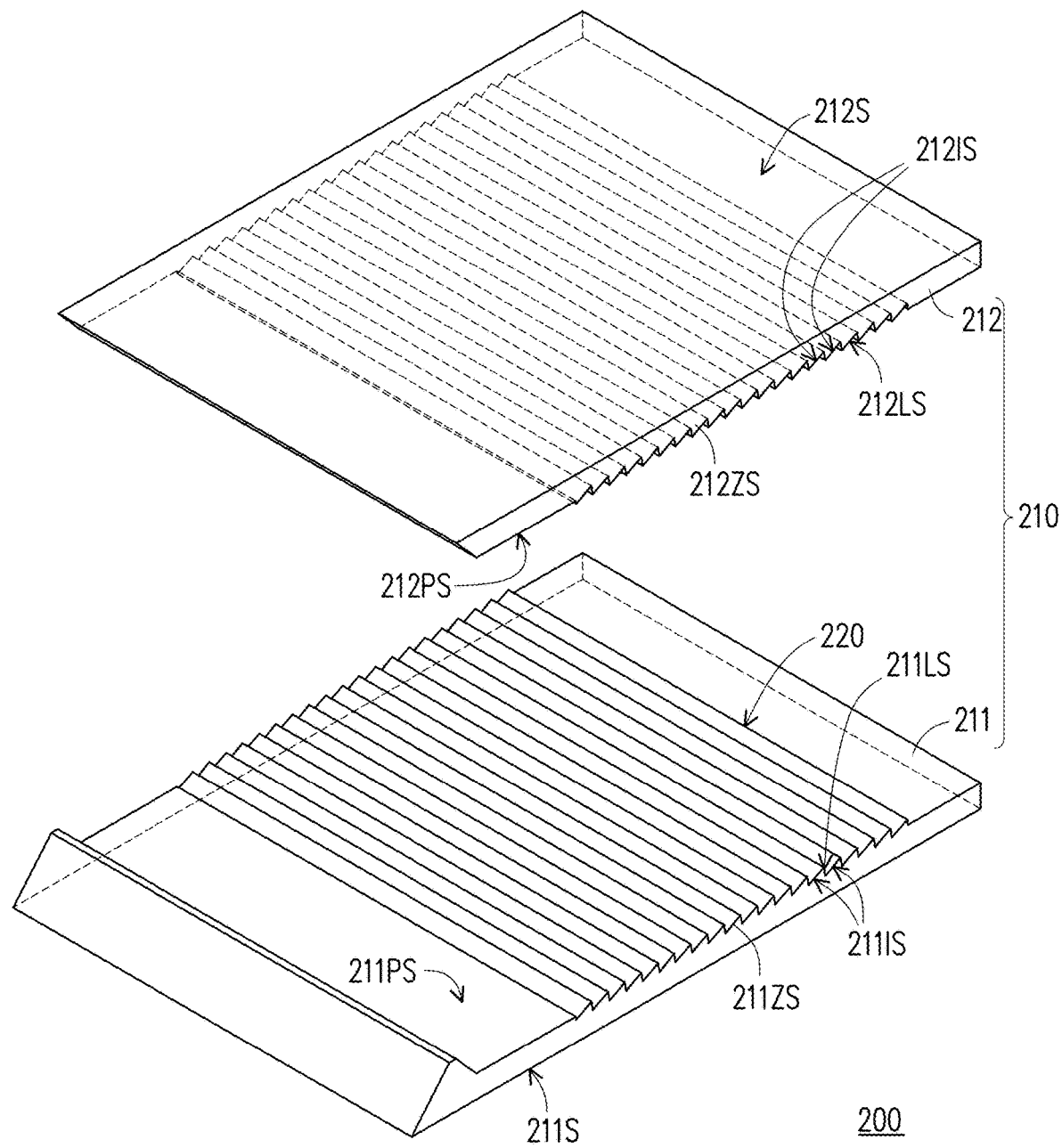
FIG. 3A is an exploded schematic diagram of a second waveguide of FIG. 1B.
Figure 3B:
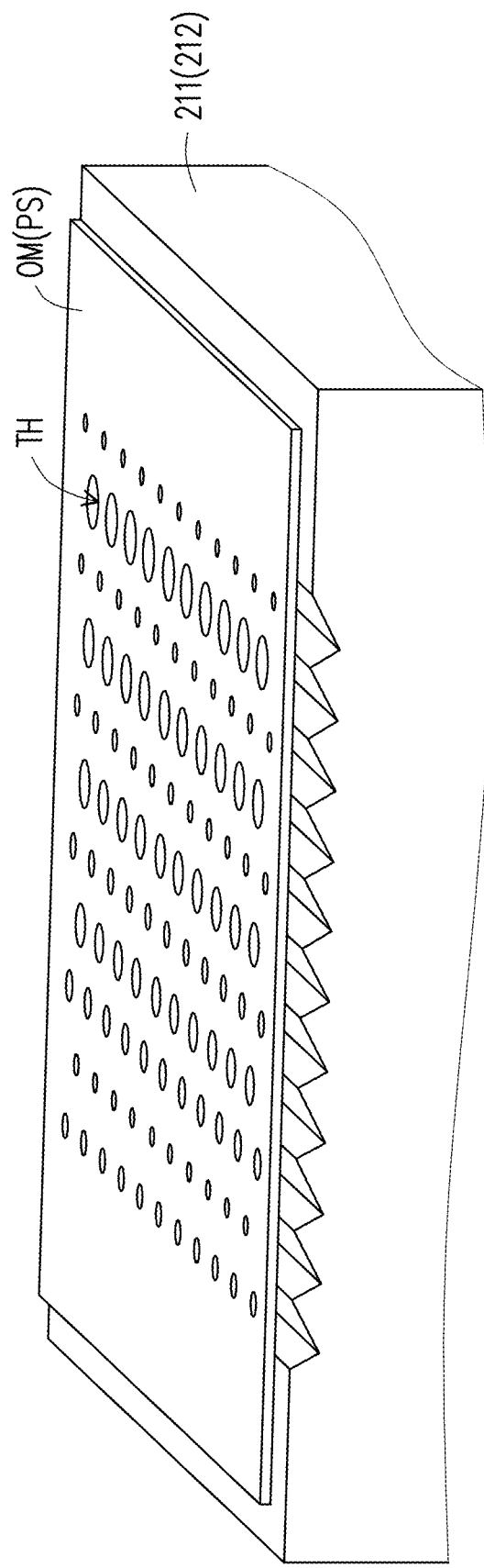
FIG. 3B is a schematic diagram of a photomask for manufacturing the second waveguide of FIG. 3A.

FIG. 3A is an exploded schematic diagram of a second waveguide of FIG. 1B. FIG. 3B is a schematic diagram of a photomask for manufacturing the second waveguide of FIG. 3A.

Figure 3C:
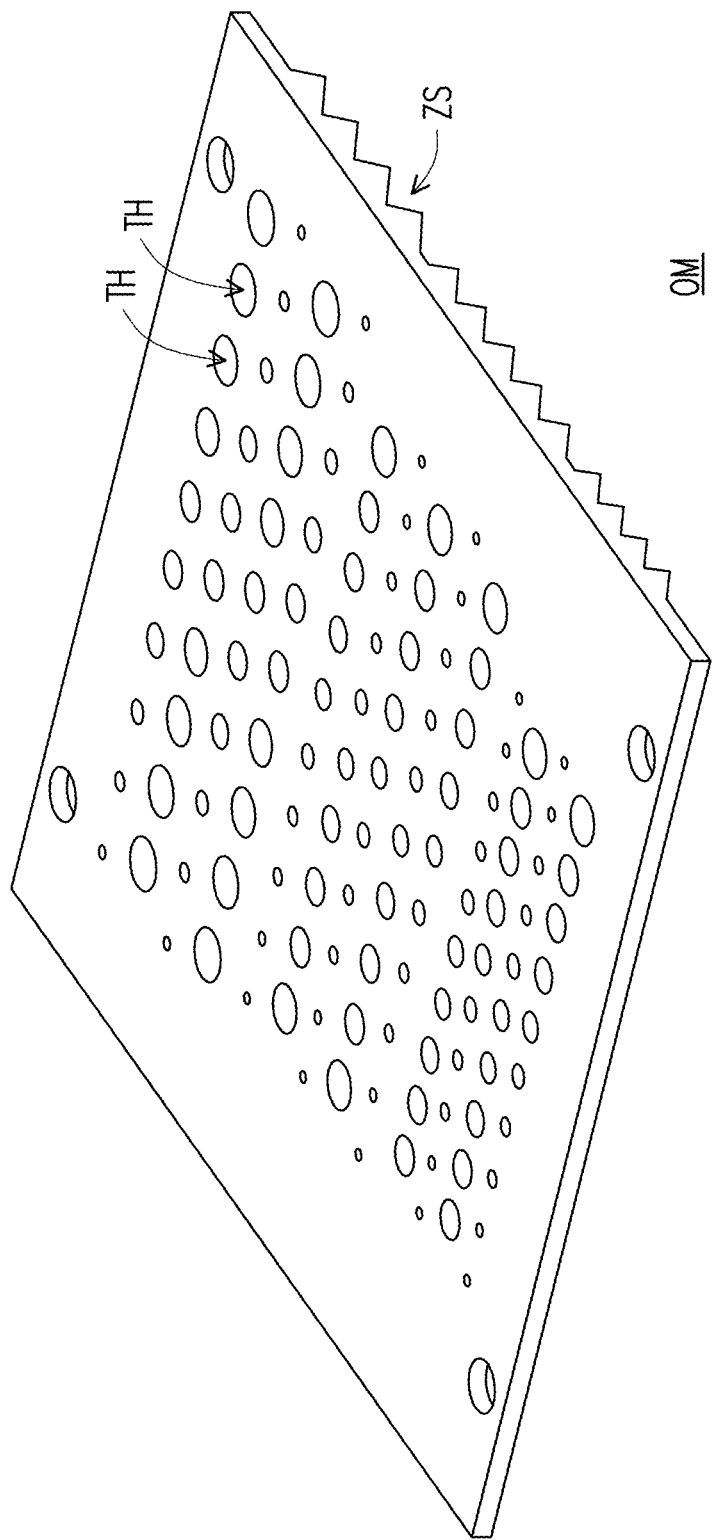
FIG. 3C is a schematic front view of another photomask for manufacturing the second waveguide of FIG. 3A.
Figure 3D:
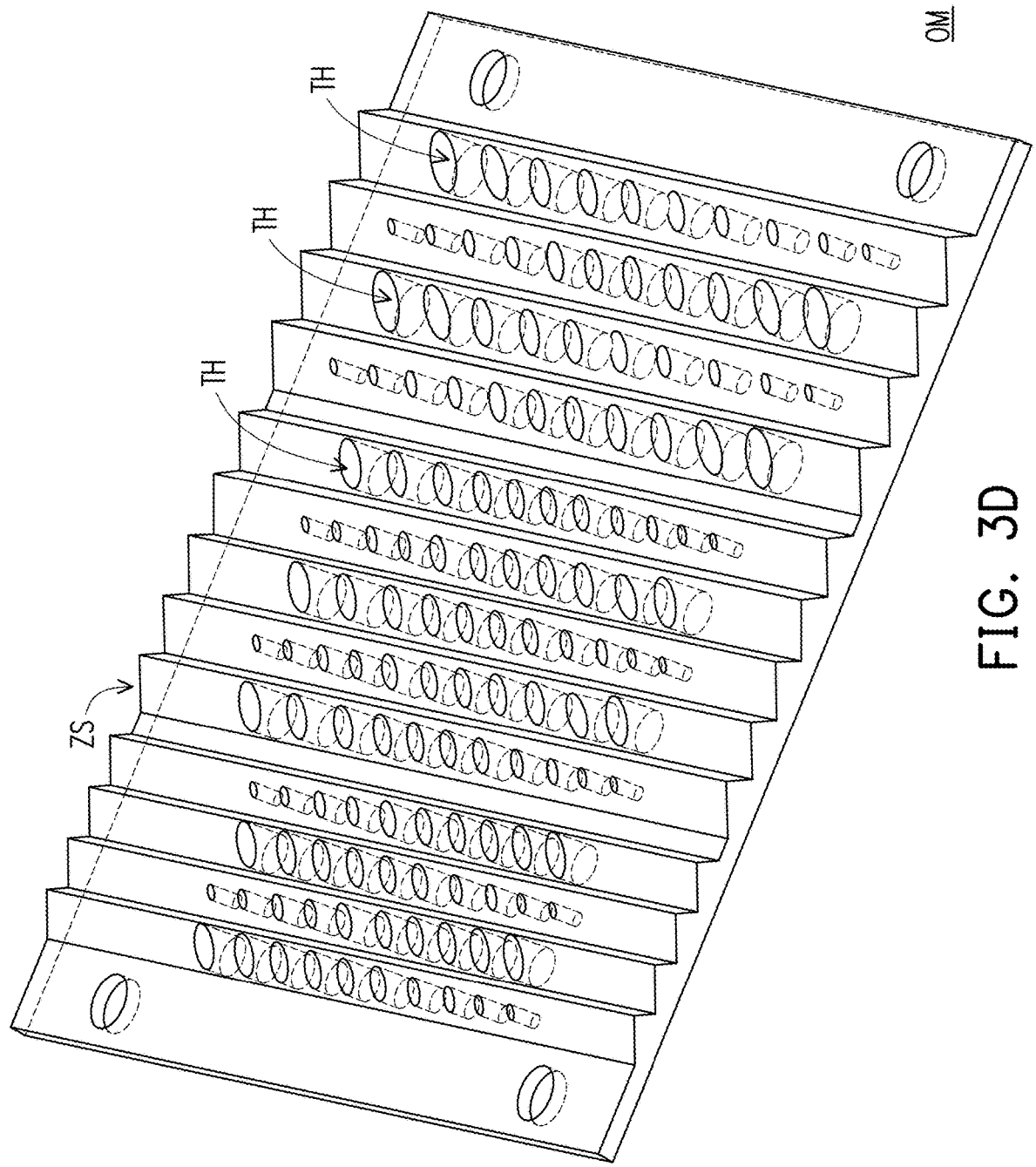
FIG. 3D is a schematic bottom view of the photomask of FIG. 3C.

FIG. 3C is a schematic front view of another photomask for manufacturing the second waveguide of FIG. 3A. FIG. 3D is a schematic bottom view of the photomask of FIG. 3C.

Figure 3E:
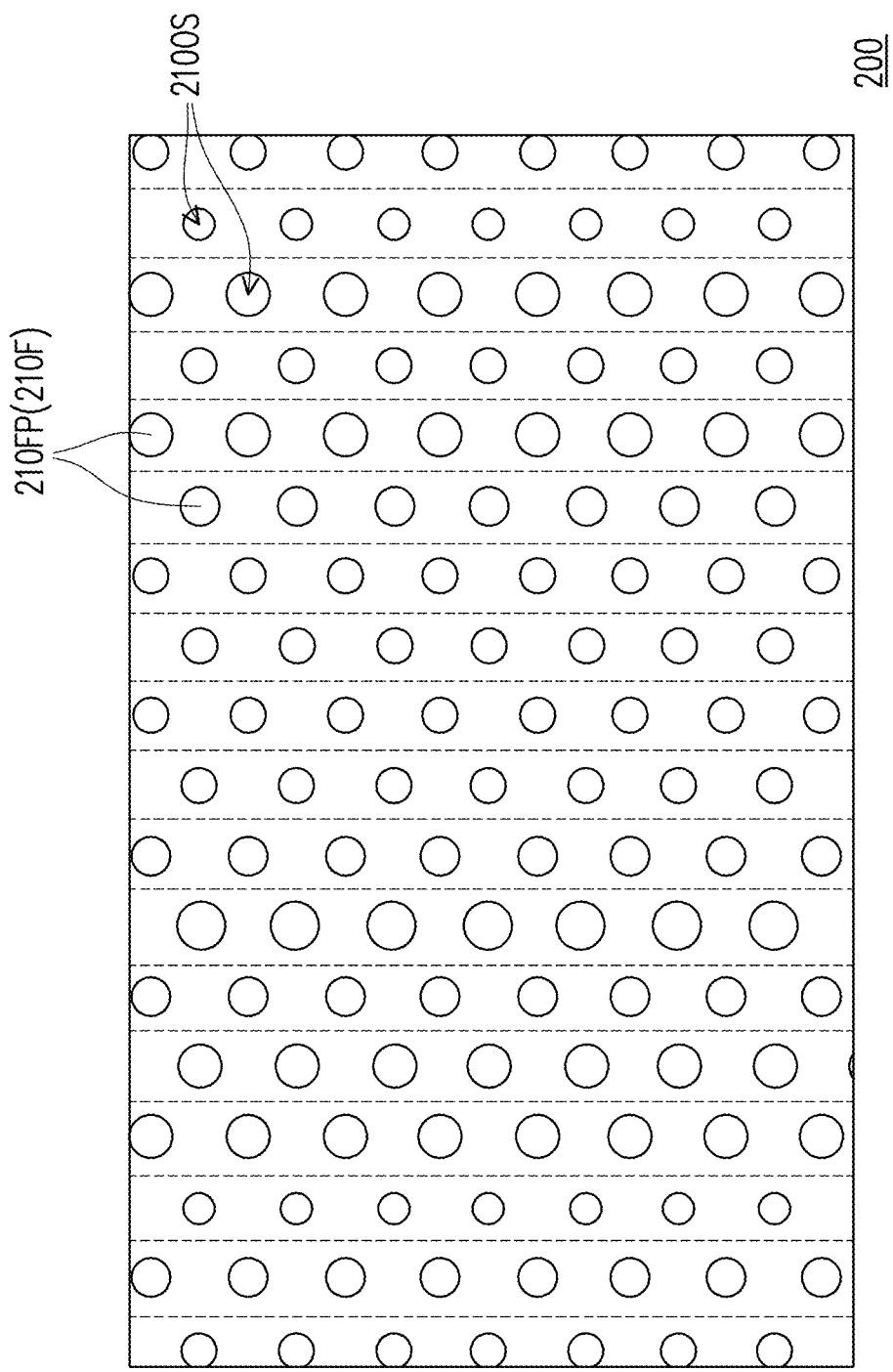
FIG. 3E is a schematic front view of the second waveguide of FIG. 1B.

FIG. 3E is a schematic front view of the second waveguide of FIG. 1B. As shown in FIG. 3A to FIG. 3E, in this embodiment, the second waveguide 200 includes a second plate 210, a plurality of optical micro structures 220 and a plurality of light guide optical film patterns 210FP. The second plate 210 has a first surface 211S, a second surface 212S and a light incidence surface for connecting the second surface 112S. The second optical micro structures 220 are located in the second plate 210. Each of the second optical micro structures 220 includes at least one optical surface 210OS. The optical surfaces 210OS of the second optical micro structures 220 are respectively inclined with respect to the first surface 211S.

More specifically, as shown in FIG. 3A to FIG. 3B, the light guide optical film patterns 210FP are located on the optical surfaces 210OS of the second optical micro structures 220. The light guide optical film pattern 210FP is configured to allow the part of the image beam IB to pass through and reflect the other part of the image beam IB. For instance, the second waveguide 200 can be manufactured in the following steps. First of all, a first structure layer 211 and a second structure layer 212 are provided. The first structure layer 211 has a plurality of first inclined surfaces 211IS and a plurality of first link surfaces 211LS. The second structure layer 212 also has a plurality of second inclined surfaces 212IS and a plurality of second link surfaces 212LS. Each of the first link surfaces 211LS connects different ends of the adjacent first inclined surfaces 211IS to form a first zigzag-shaped structure 211ZS. Each of the second link surfaces 212LS connects different ends of the adjacent second inclined surfaces 212IS to form a second zigzag-shaped structure 212ZS.

At least one optical film 210F is formed on at least one of the first inclined surfaces 211IS of the first structure layer 211 or at least one of the second inclined surfaces 212IS of the second structure layer 212. The method of forming the at least one optical film 210F includes the following steps. A photomask OM is provided, and the photomask OM has a plurality of through holes TH. For instance, as shown in FIG. 3B, the photomask OM may be a plane structure PS.

More specifically, as shown in FIG. 3B, in this embodiment, the photomask OM is made to overlap the first structure layer 211 or the second structure layer 212, and projection planes of the through holes TH on the first structure layer 211 or the second structure layer 212 are made to overlap the at least one of the first inclined surfaces 211IS of the first structure slayer 211 or the at least one of the second inclined surfaces 212IS of the second structure layer 212. In this way, through the through holes TH of the photomask OM shown in FIG. 3C and FIG. 3D, the light guide optical film patterns 210FP of the at least one optical film 210F can be formed on the at least one of the first inclined surfaces 211IS of the first structure layer 211 or at least one of the second inclined surfaces 212IS of the second structure layer 212. However, the invention is not limited in this regard. It should be noted that, in another embodiment, the photomask OM may also be a zigzag-shaped structure (as shown in FIG. 3C and FIG. 3D).

More specifically, as shown in FIG. 3C and FIG. 3D, when the photomask OM has the zigzag-shaped structure, the zigzag-shaped structure is able to mesh with the first zigzag-shaped structure 211ZS or the second zigzag-shaped structure 212ZS, and the through holes TH of the photomask OM penetrate a plurality of inclined surfaces of the zigzag-shaped structure. Inclined surfaces of the zigzag-shaped structure correspond to the at least one of the first inclined surfaces 211IS of the first structure layer 211 or the at least one second inclined surfaces 212IS of the second structure layer 212. Next, the photomask OM shown in FIG. 3C and FIG. 3D is made to overlap the first structure layer 211 or the second structure layer 212, and projection planes of the through holes TH on the first structure layer 211 or the second structure layer 212 are made to overlap the at least one of the first inclined surfaces 211IS of the first structure slayer 211 or the at least one of the second inclined surfaces 212IS of the second structure layer 212. In this way, through the through holes TH of the photomask OM shown in FIG. 3C and FIG. 3D, the light guide optical film patterns 210FP of the at least one optical film 210F can be formed on the at least one of the first inclined surfaces 211IS of the first structure layer 211 or at least one of the second inclined surfaces 212IS of the second structure layer 212.

Then, the first structure layer 211 and the second structure layer 212 are bonded. The second inclined surfaces 212IS correspond to the first inclined surfaces 211IS and the second link surfaces 212LS correspond to the first link surfaces 211LS, so that the first zigzag-shaped structure 211ZS is able to mesh with the second zigzag-shaped structure 212ZS and the second inclined surfaces 212IS and the first inclined surfaces 211IS are in contact to form a plurality of optical surfaces 210OS of the optical micro structures. Accordingly, the second plate 210 of the second waveguide 200 is formed after the first structure layer 211 and the second structure layer 212 are bonded. Here, the optical micro structures are the second optical micro structures 220, and the light guide optical film patterns 210FP of the at least one optical film 210F are formed on the optical surface 210OS.

For instance, in this embodiment, the first optical micro structure 120 of the first waveguide 100 are arranged along a first direction D1, the second optical micro structures 220 of the second waveguide 200 are arranged along a second direction D2, and the first direction D1 is perpendicular to the second direction D2. In this way, since the optical micro structures in the first waveguide 100 and the second waveguide 200 are configured differently, the functions of the second waveguide 200 and the first waveguide 100 are also different. The function of the first waveguide 100 is mainly to transmit the image beam IB to the second waveguide 200 and enable the pupil aperture of the image beam IB coupled to the second waveguide 200 to be effectively expanded. The function of the second waveguide 200 is mainly to allow the image beam IB to be transmitted to the user's eyes, and thus needs to provide a larger viewing angle. Further, the light guide optical film patterns 210FP of the second waveguide 200 can also be designed to have a circular outline, sizes of the light guide optical film patterns 210FP are not consistent, and there is a distance between each other. In this way, the image beam IB from the first waveguide 100 can be transmitted farther in the second waveguide 200, and the image beam IB with a large angle effectively controlled can be reflected by the light guide optical film patterns 210FP of the second waveguide 200 to be eventually directed to the eye EY. Accordingly, an optical system of the head mounted display device 300 with a large viewing angle can be formed.

More specifically, the distance between the light guide optical film patterns 210FP needs to be defined according to the size of the pupil of the human eye, so as to provide a good visual experience by preventing the user from feeling that the light guide optical film patterns 210FP are too dense. In an embodiment of the invention, a minimum distance between adjacent two of the light guide optical film patterns 210FP is smaller than a size of a pupil of a user. For instance, the minimum distance between adjacent two of the light guide optical film patterns 210FP approximately equal to 0.5 times the size of the pupil of the user.

On the other hand, the intensiveness perception of the light guide optical film pattern 210FP seen by the user under different pupil sizes is different. When the pupil of the human eye is larger, the more light it can receive, and the intensiveness caused by the light guide optical film pattern 210FP will be greatly reduced. Therefore, during the design process, the size of the light guide optical film pattern 210FP can also be controlled to prevent the light guide optical film pattern 210FP from causing severe intensiveness. A ratio of a size of each of the light guide optical film patterns 210FP to the minimum distance between the adjacent two of the light guide optical film patterns 210FP is between 0.6 and 0.7. The ratio of the size of each of the light guide optical film patterns 210FP to the minimum distance between the adjacent two of the light guide optical film patterns 210FP is preferably 0.6. For example, in this embodiment, under the condition that the minimum distance between the adjacent two of light guide optical film patterns 210FP is 1.5 mm, the size of the light guide optical film pattern 210FP can be controlled below 1.1 mm. In this way, the user will have a better visual experience.

Accordingly, when the image beam IB from the first waveguide 100 enters the second plate 210 through the light incident surface, the part of the image beam IB can pass through the light guide optical film patterns 210FP, and the other part of the image beam IB leaves the second plate 210 from the second surface 212S after being reflected by the light guide optical film patterns 210FP. More specifically, in this embodiment, a ratio of an orthographic projection area of the light guide optical film patterns 210FP on the second plate 210 to an area of the second plate 210 is less than 30%, so as to obtain a better penetration field. For example, the area of the light guide optical film pattern 210FP is approximately 20% of the area of the second plate 210. Moreover, since the light guide optical film pattern 210FP have a transmittance of approximately 50%, the overall penetration field efficiency of the optical system of the head mounted display device 300 can be increased to approximately 90%, thereby achieving a good penetration field.

Figure 4A:
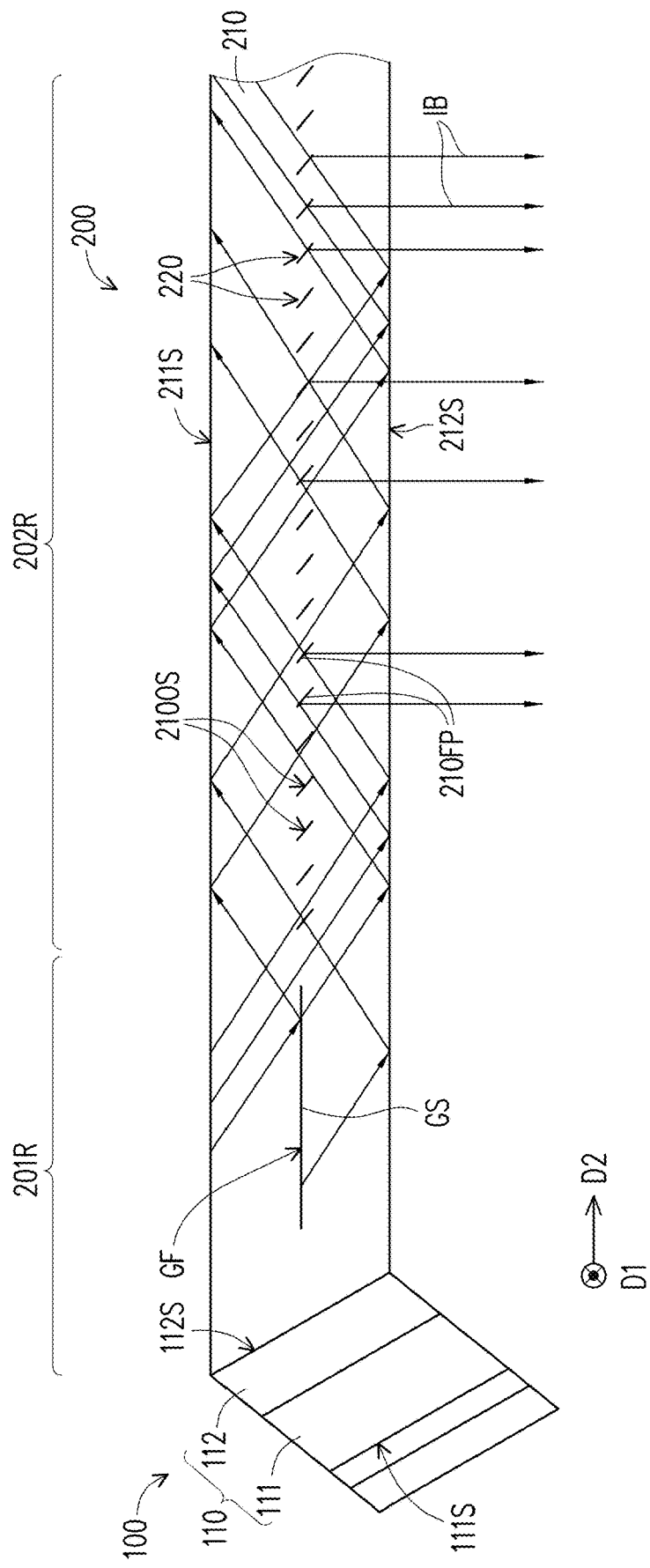
FIG. 4A is a schematic diagram of an optical path of the head mounted display device of FIG. 1A.
Figure 4B:
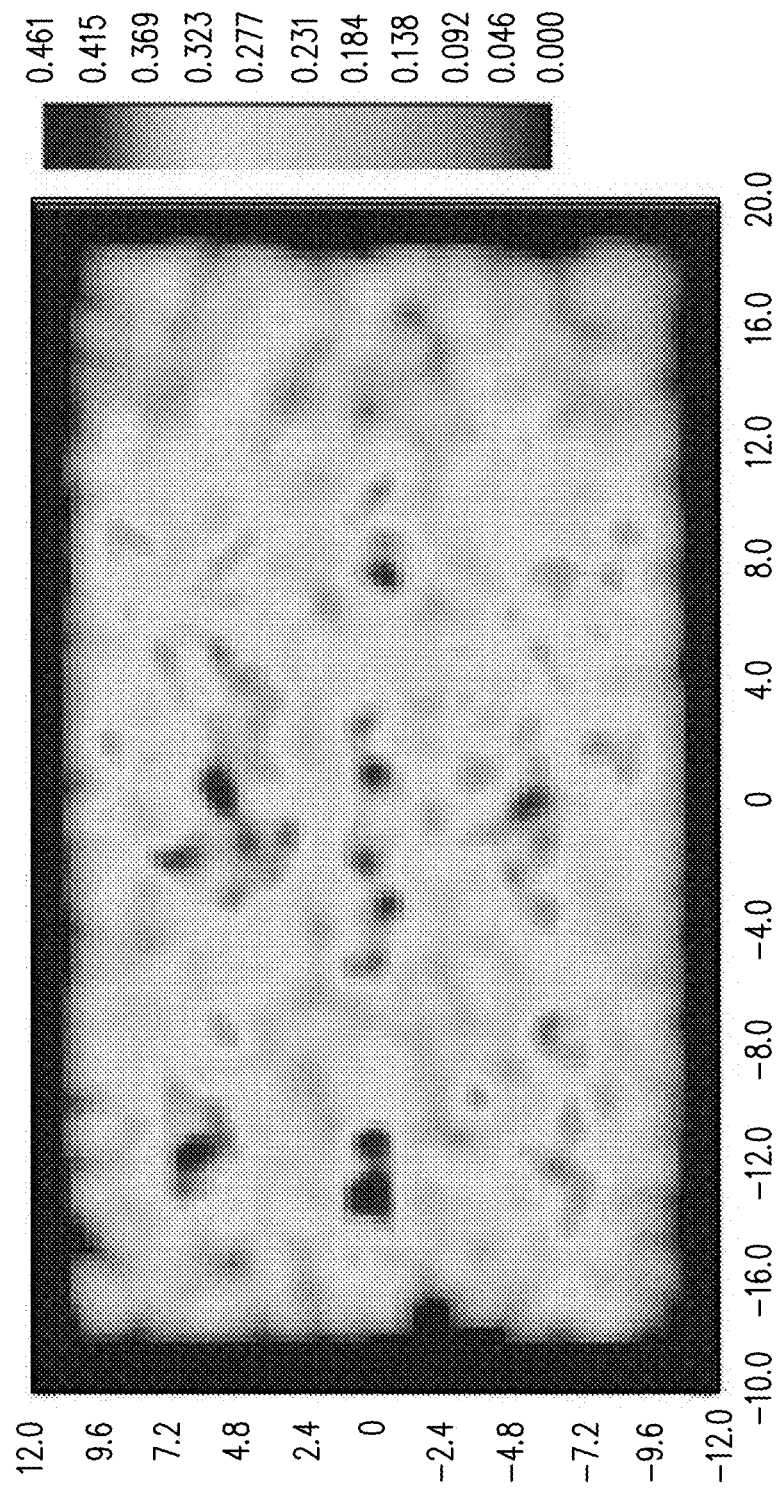
FIG. 4B is a schematic diagram of an optical path of the head mounted display device of FIG. 1A.
Figure 4C:
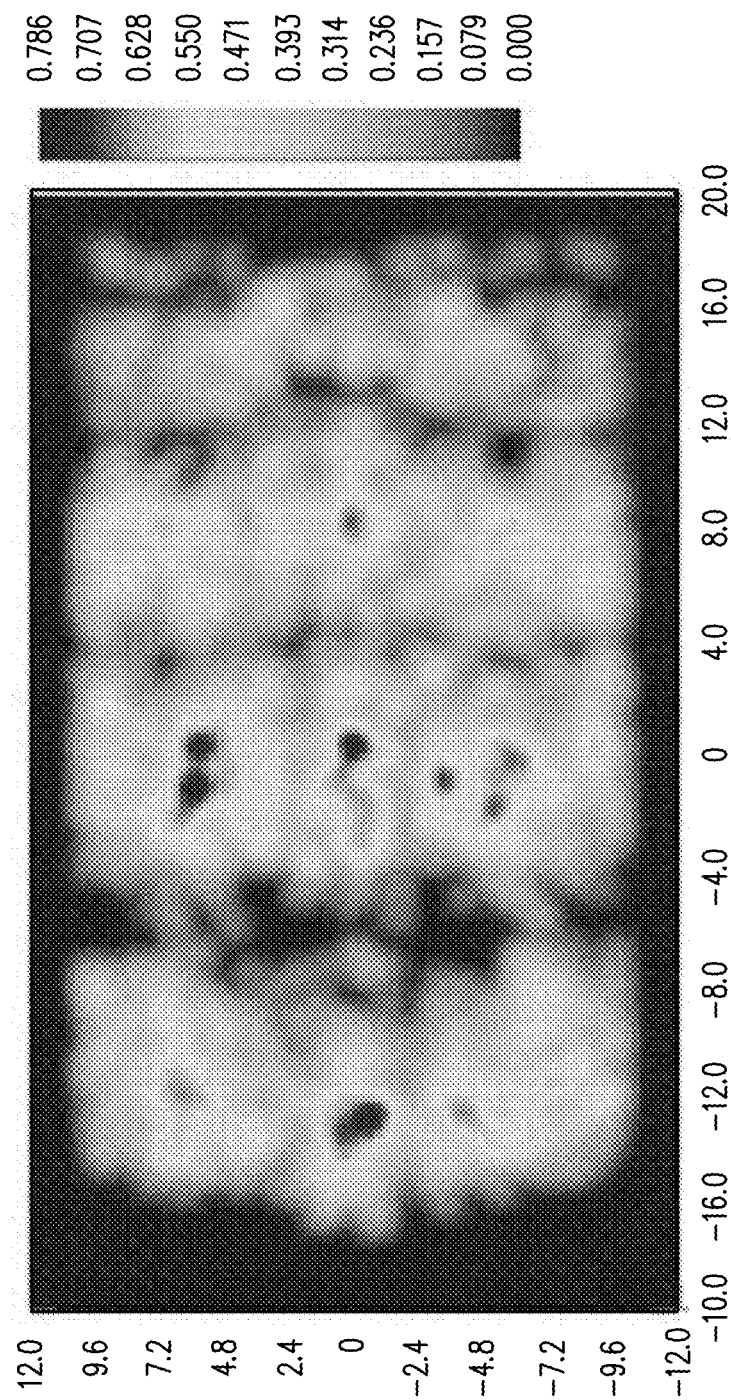
FIG. 4C is a schematic diagram of an optical path of a head mounted display device of a comparative example.

FIG. 4A is a schematic diagram of an optical path of the head mounted display device of FIG. 1A. FIG. 4B is a simulation data diagram of the brightness of the image beam presented by the head mounted display device of FIG. 1A. FIG. 4C is a simulation data diagram of the brightness of the image beam presented by the head mounted display device when the light guide film is not configured in a comparative example. More specifically, as shown in FIG. 4A, in this embodiment, the second waveguide 200 has a first optical region 201R and a second optical regions 202R. The first optical region 201R is located between the light incidence surface and the second optical region 202R. The first zigzag-shaped structure 211ZS, the second zigzag-shaped structure 212ZS and the second optical micro structures 220 are located in the second optical region 202R. The second waveguide 200 further includes a light guide film GF. The light guide film GF is located on a light guide surface GS inside the second waveguide 200. The light guide surface GS is located in the first optical region 201R and parallel to the first surface of the second plate 211S.

Furthermore, of the light guide film GF may be manufactured together when forming the light guide optical film patterns 210FP of the at least one optical film 210F. For example, in this embodiment, the first structure layer 211 of the second waveguide 200 also has a first plane 211PS, and the second structure layer 212l further includes a second plane 212PS. While forming the light guide optical film patterns 210FP of the at least one optical film 210F, the light guide film GF is also formed on the first plane or the second plane. Then, after the first structure layer 211 and the second structure layer 212 are bonded, the second plane and the first plane are in contact to form the light guide surface GS, and the light guide film GF can be formed thereon.

Specifically, as shown in FIG. 4A, the light guide film GF is configured to allow the part of the image beam IB to pass through and reflect the other part of the image beam IB. The image beam IB passed through the light guide film GF is transmitted in the second waveguide 200 in a manner of total reflection. In this way, the uniformity of the image beam IB entering the second waveguide 200 can be further enhanced.

Furthermore, as shown in FIG. 4B, when the light guide film GF is provided, the light guide film GF can effectively increase the intensiveness of the image beam IB. Moreover, since the light guide film GF is located inside the second waveguide 200, compared with the case where the light guide film GF is plated on the outer surface of the second waveguide 200, the uniformity can be greatly increased and the optical efficiency can be maintained. In this way, an image frame presented by the image beam IB transmitted to the human eye through the second waveguide 200 in the head mounted display device 300 can have good uniformity, and the frame is not prone to defects. In contrast, as shown in FIG. 4C, when the light guide film GF is not provided, the uniformity of the image light beam IB transmitted to the human eye through the second waveguide 200 in the head mounted display device 300 is significantly reduced. Therefore, the image beam IB that enters the human eye will lack light in some areas In this way, the image frame seen by the human eye will be defective and incomplete, which will affect the viewing quality.

In summary, the embodiments of the invention have at least one of the following advantages and effects. In the embodiments of the invention, through the configuration of the first waveguide, the image beam can be transmitted to the second waveguide, and a light shape can be adjusted, while maintaining the angle of view and expanding the pupil aperture in a single dimension. Through the configuration of the second waveguide, the transmission path of the image beam can be extended and has good uniformity. In this way, the head mounted display device can have a large viewing angle and can provide good viewing quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

The invention claimed is:

1. A head mounted display device comprising: a display unit, a first waveguide and a second waveguide, wherein
the display unit is configured to provide an image beam;
the first waveguide is located on a transmission path of the image beam, and the first waveguide comprises a first plate, a plurality of optical films and a plurality of first optical micro structures, wherein
each of the plurality of the optical films is configured to perform partial transmission and partial reflection on the image beam,
the plurality of first optical micro structures are located in the first plate, and the plurality of first optical micro structures comprise central optical micro structures, relay optical micro structures and edge optical micro structures, wherein at least one of the plurality of the optical films is located on the central optical micro structures or on the edge optical micro structures, the at least one of the plurality of the optical films has a reflectivity of the image beam and a transmittance of the image beam, and the reflectivity of the image beam is greater than the transmittance of the image beam; and
wherein at least another one of the plurality of the optical films is located on the relay optical micro structures, the at least another one of the plurality of the optical films has a reflectivity of the image beam and a transmittance of the image beam, and the reflectivity of the image beam is less than the transmittance of the image beam, wherein
the central optical micro structures are respectively located on two sides of a main axis of the image beam;
the edge optical micro structures and the relay optical micro structures are respectively located on the two sides of the main axis of the image beam, and the central optical micro structures are closer to the main axis of the image beam than the edge optical micro structures, and the relay optical micro structures are provided between the central optical micro structures and the edge optical micro structures, wherein after the image beam enters the first plate through a first surface of the first plate, a part of the image beam passes through the central optical micro structures and leaves the first plate, an other part of the image beam is transmitted in the first plate after being reflected by the central optical micro structures, and a part of the other part of the image beam travels to the edge optical micro structures and leaves the first plate from a second surface of the first plate;

the second waveguide is located on the transmission path of the image beam, wherein the first waveguide is located between the display unit and the second waveguide, the first waveguide is configured to transmit the image beam to the second waveguide and adjust a light shape of the image beam, the second waveguide is configured to transmit the image beam to outside of the head mounted display device, and the second waveguide comprises a second plate, a plurality of second optical micro structures and a plurality of light guide optical film patterns, wherein the second plate has a light incidence surface, and the light incidence surface connects a first surface and a second surface of the second plate;

the second optical micro structures are located in the second plate, wherein each of the second optical micro structures has an optical surface, and the optical surfaces of the second optical micro structures are respectively inclined with respect to the first surface of the second plate;

the light guide optical film patterns are located on the optical surfaces of the second optical micro structures, and the light guide optical film patterns are configured to allow a part of the image beam from the first waveguide to pass through and reflect an other part of the image beam from the first waveguide, wherein after the image beam enters the second plate through the light incidence surface, the part of the image beam from the first waveguide passes through the light guide optical film patterns, and the other part of the image beam from the first waveguide leaves the second plate from the second surface of the second plate after being reflected by the light guide optical film patterns.

2. The head mounted display device of claim 1, wherein a ratio of an orthographic projection area of the light guide optical film patterns on the second plate to an area of the second plate is less than 30%.

3. The head mounted display device of claim 1, wherein an included angle between the first waveguide and the second waveguide is between 90 degrees and 135 degrees.

4. The head mounted display device of claim 1, wherein the first optical micro structures of the first waveguide are arranged along a first direction, the second optical micro structures of the second waveguide are arranged along a second direction, and the first direction is perpendicular to the second direction.

5. The head mounted display device of claim 1, wherein each of the first optical micro structures has an optical surface, and the optical surfaces of the first optical micro structures are respectively inclined with respect to the first surface of the first plate.

6. The head mounted display device of claim 5, wherein the first waveguide has a first optical region and a second optical region, the first optical region and the second optical region are respectively located on the two sides of the main axis of the image beam, and an inclined direction of the optical surfaces of the first optical micro structures located in the first optical region is mirror symmetric to an inclined direction of the optical surfaces of the first optical micro structures located in the second optical region.

7. The head mounted display device of claim 5, wherein the at least one of the plurality of the optical films is located on at least one of the optical surfaces of the first optical micro structures.

8. The head mounted display device of claim 7, wherein the part of the other of the image beam reflected by the central optical micro structures is transmitted to the edge optical micro structures after passing through the relay optical micro structures, and an other part of the other part of the image beam reflected by the central optical micro structures leaves the first plate from the second surface of the first plate after being reflected by the relay optical micro structures.

9. The head mounted display device of claim 5, wherein the first plate comprises a first structure layer and a second structure layer, wherein the first structure layer has a plurality of first inclined surfaces and a plurality of first link surfaces, wherein each of the first link surfaces connects different ends of the adjacent first inclined surfaces to form a first zigzag-shaped structure;

the second structure layer has a plurality of second inclined surfaces and a plurality of second link surfaces, wherein each of the second link surfaces connects different ends of the adjacent second inclined surfaces to form a second zigzag-shaped structure, and the second inclined surfaces correspond to the first inclined surfaces and the second link surfaces correspond to the first link surfaces, so that the first zigzag-shaped structure meshes with the second zigzag-shaped structure and the second inclined surfaces and the first inclined surfaces are in contact to form the optical surfaces of the first optical micro structures.

10. The head mounted display device of claim 9, wherein the at least one optical film is located on at least one of the first inclined surfaces of the first structure layer and the second inclined surfaces of the second structure layer.

11. The head mounted display device of claim 1, wherein the head mounted display device is configured to be placed in front of at least one eye of a user, a minimum distance between adjacent two of the light guide optical film patterns is smaller than a size of a pupil of the user.

12. The head mounted display device of claim 11, wherein a ratio of a size of each of the light guide optical film patterns to the minimum distance between the adjacent two of the light guide optical film patterns is between 0.6 and 0.7.

13. The head mounted display device of claim 11, wherein the second plate comprises a first structure layer and a second structure layer, wherein the first structure layer has a plurality of first inclined surfaces and a plurality of first link surfaces, wherein each of the first link surfaces connects different ends of the adjacent first inclined surfaces to form a first zigzag-shaped structure;

the second structure layer has a plurality of second inclined surfaces and a plurality of second link surfaces, wherein each of the second link surfaces connects different ends of the adjacent second inclined surfaces to form a second zigzag-shaped structure, and the second inclined surfaces correspond to the first inclined surfaces and the second link surfaces correspond to the first link surfaces, so that the first zigzag-shaped structure meshes with the second zigzag-shaped structure and the second inclined surfaces and the first inclined surfaces are in contact to form the optical surfaces of the second optical micro structures.

14. The head mounted display device of claim 13, wherein the second waveguide has a first optical region and a second optical region, wherein the first optical region is located between the light incidence surface and the second optical region, the first zigzag-shaped structure, the second zigzag-shaped structure and the second optical micro structures are located in the second optical region, and the second waveguide further comprises:
a light guide film, the light guide film being located on a light guide surface inside the second waveguide, the light guide surface being located in the first optical region and parallel to the first surface of the second plate, wherein the light guide film is configured to allow the part of the image beam from the first waveguide to pass through and reflect the other part of the image beam from the first waveguide, and the part of the image beam from the first waveguide passed through the light guide film is transmitted in the second waveguide in a manner of total reflection.

15. The head mounted display device of claim 13, wherein the first structure layer further includes a first plane, the second structure layer further includes a second plane, and the second plane and the first plane are in contact to form the light guide surface.

16. A waveguide adapted for a head mounted display device to receive an image provided by a display unit of the head mounted display device, wherein
the waveguide is located on a transmission path of the image beam, and the waveguide comprises:
a first plate;
a plurality of optical films, each of the plurality of the optical films is configured to perform partial transmission and partial reflection on the image beam; and
a plurality of first optical micro structures, configured to be located in the first plate, wherein the plurality of first optical micro structures comprise central optical micro structures, relay optical micro structures and edge optical micro structures, wherein at least one of the plurality of the optical films is located on the central optical micro structures or on the edge optical micro structures, the at least one of the plurality of the optical films has a reflectivity of the image beam and a transmittance of the image beam, and the reflectivity of the image beam is greater than the transmittance of the image beam; and wherein at least another one of the plurality of the optical films is located on the relay optical micro structures, the at least another one of the plurality of the optical films has a reflectivity of the image beam and a transmittance of the image beam, and the reflectivity of the image beam is less than the transmittance of the image beam, wherein
the central optical micro structures are respectively located on two sides of a main axis of the image beam; and
the edge optical micro structures and the relay optical micro structures are respectively located on the two sides of the main axis of the image beam, and wherein the central optical micro structures are closer to the main axis of the image beam than the edge optical micro structures, and the relay optical micro structures are provided between the central optical micro structures and the edge optical micro structures, wherein after the image beam enters the first plate through a first surface of the first plate, a part of the image beam passes through the central optical micro structures and leaves the first plate, an other part of the image beam is transmitted in the first plate after being reflected by the central optical micro structures, and a part of the other part of the image beam travels to the edge optical micro structures and leaves the first plate from a second surface of the first plate.

* * * * *